(12) United States Patent
Ruan et al.

(10) Patent No.: US 7,791,878 B2
(45) Date of Patent: Sep. 7, 2010

(54) LOCKING STRUCTURE

(75) Inventors: Zhuo-Guang Ruan, Guangdong (CN); Cheng-Hung Chou, Taipei Hsien (TW); Tsung-Je Chiu, Taipei Hsien (TW)

(73) Assignees: Premier Image Technology (China) Ltd., Foshan, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 194 days.

(21) Appl. No.: 12/200,853

(22) Filed: Aug. 28, 2008

(65) Prior Publication Data

US 2009/0219700 A1  Sep. 3, 2009

(30) Foreign Application Priority Data

Feb. 29, 2008  (CN) .................... 2008 1 0300441

(51) Int. Cl.
*H05K 5/00* (2006.01)
*H05K 7/00* (2006.01)
(52) U.S. Cl. ............... 361/679.58; 361/679.55; 361/679.56
(58) Field of Classification Search ............ 361/679.01, 361/679.55, 679.56, 679.58
See application file for complete search history.

(56) References Cited

U.S. PATENT DOCUMENTS 6,076,869 A * 6/2000 Chen et al. .............. 292/202
7,436,656 B2 * 10/2008 Jiang et al. ............. 361/679.55

* cited by examiner

*Primary Examiner*—Jayprakash N Gandhi
*Assistant Examiner*—Anthony M Haughton
(74) *Attorney, Agent, or Firm*—Zhigang Ma

(57) ABSTRACT

A locking structure of a housing for a portable electronic device is disclosed. The housing defines an opening therein. The locking structure includes an engagement-receiving member, a bended rod, and a securing member. The engagement-receiving member is fixed to the housing so as to partially seal the opening but leave a rod entrance between the engagement-receiving member and the housing. The engagement-receiving member defines two rod-bearing portion at the rod entrance. The bended rod includes two distal shaft portions and a mesial swinging portion. The two distal shaft portions are borne by the rod-bearing portions respectively. The swinging potion is received in the opening and is capable of swinging out from the opening. The securing member is shaped so as to tightly fit into the entrance, thereby securing the bended rod to the engagement-receiving member.

5 Claims, 4 Drawing Sheets

LOCKING STRUCTURE

TECHNICAL FIELD

The present invention generally relates to locking structures and, particularly, to a locking structure for a portable electronic device.

BACKGROUND

Nowadays, many electronic devices are being miniaturized to meet requirements of portability. Therefore, these devices become more and more smaller in size and likely to be stolen when they are on exhibit.

To avoid the above mentioned situation, such a devices, on one hand, usually defines a locking-receiving structure in the housing thereof and, on the other hand, a locking member mating with the locking-receiving structure is employed for locking the device to a fixed structure. The challenging of utilizing such a couple of locking-receiving structure and locking member is that the locking-receiving structure and the locking member are typically one-to-one matched. Therefore, if the locking member is physically damaged or lost, it is difficult to find another replaceable locking member.

What is needed, therefore, is an locking structure to overcome the above mentioned problems.

SUMMARY

A locking structure of a housing for a portable electronic device is disclosed. The housing defines an opening therein. The locking structure includes an engagement-receiving member, a bended rod, and a securing member. The engagement-receiving member is fixed to the housing so as to partially seal the opening but leave a rod entrance between the engagement-receiving member and the housing. The engagement-receiving member defines two rod-bearing portions at the rod entrance. The bended rod includes two distal shaft portions and a mesial swinging portion. The two distal shaft portions are borne by the rod-bearing portions respectively. The swinging potion is received in the opening and is capable of swinging out from the opening. The securing member is shaped so as to tightly fit into the entrance, thereby securing the bended rod to the engagement-receiving member.

DETAILED DESCRIPTION OF THE EMBODIMENTS

Figure 1:
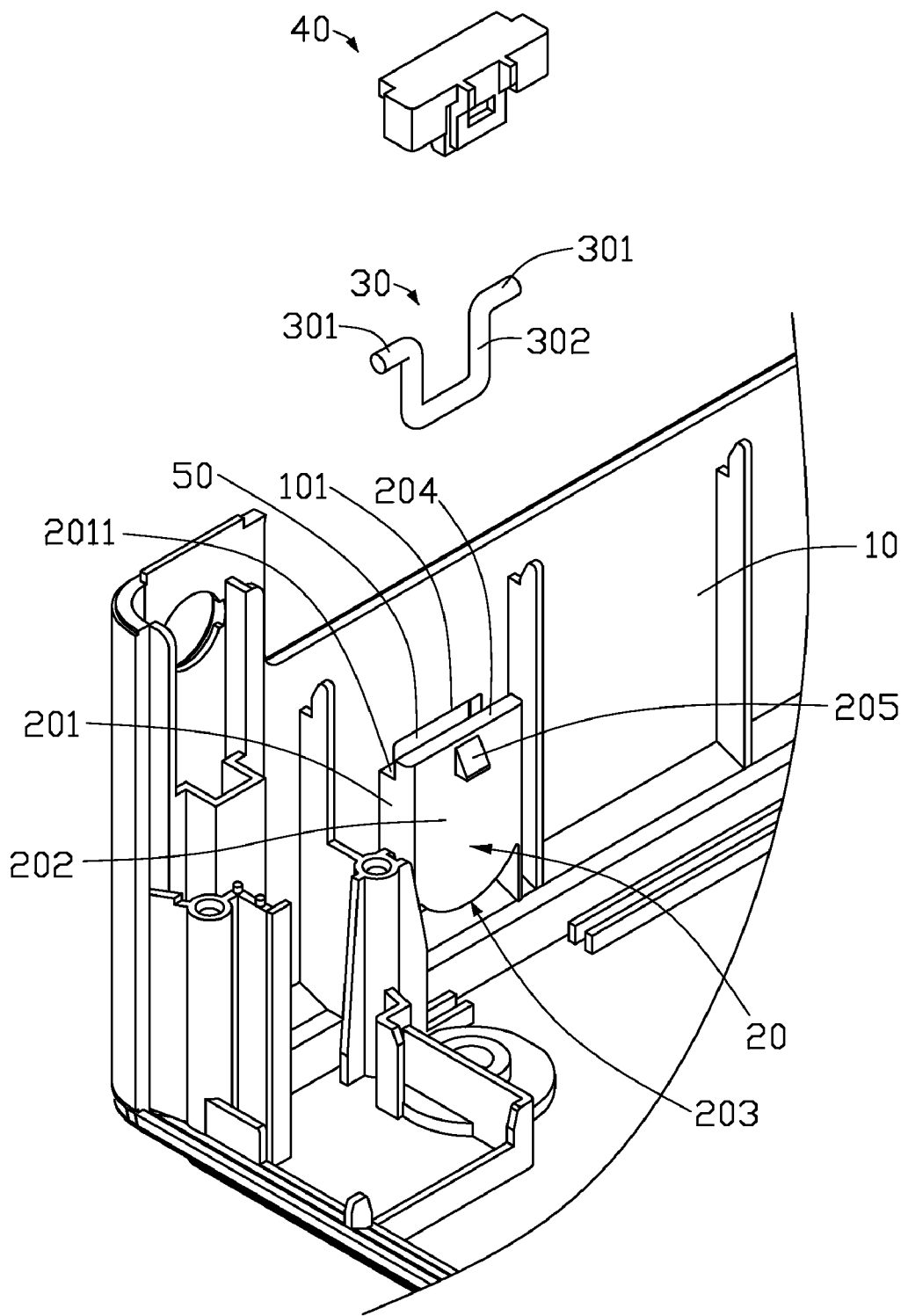
FIG. 1 is an isometric, partially exploded view of a locking structure including a securing member, according to an exemplary embodiment of the present invention.

Referring to FIG. 1, a locking structure of a housing 10 is shown. The housing can be used in a variety of portable electronic devices such as mobile phones, cameras, and projectors. The housing 10 defines an opening 101 therein. The locking structure includes an engagement-receiving member 20, a bended rod 30 and a securing member 40. The engagement-receiving member 20 is fixed to the housing 10 so as to partially seal the opening 101 but leave a rod entrance 50 between the engagement-receiving member 20 and the housing 10. The engagement-receiving member 20 defines two rod-bearing portions 2011 at the rod entrance. The bended rod 30 includes two distal shaft portions 301 and a mesial swinging portion 302. The two distal shaft portions 301 are borne by the rod-bearing potions 2011 respectively. The swinging potion 302 is received in the opening 101 and is capable of swinging out from the opening 101. The securing member 40 is shaped so as to tightly fit into the entrance, thereby securing the bended rod 30 to the engagement-receiving member 20.

Figure 4:
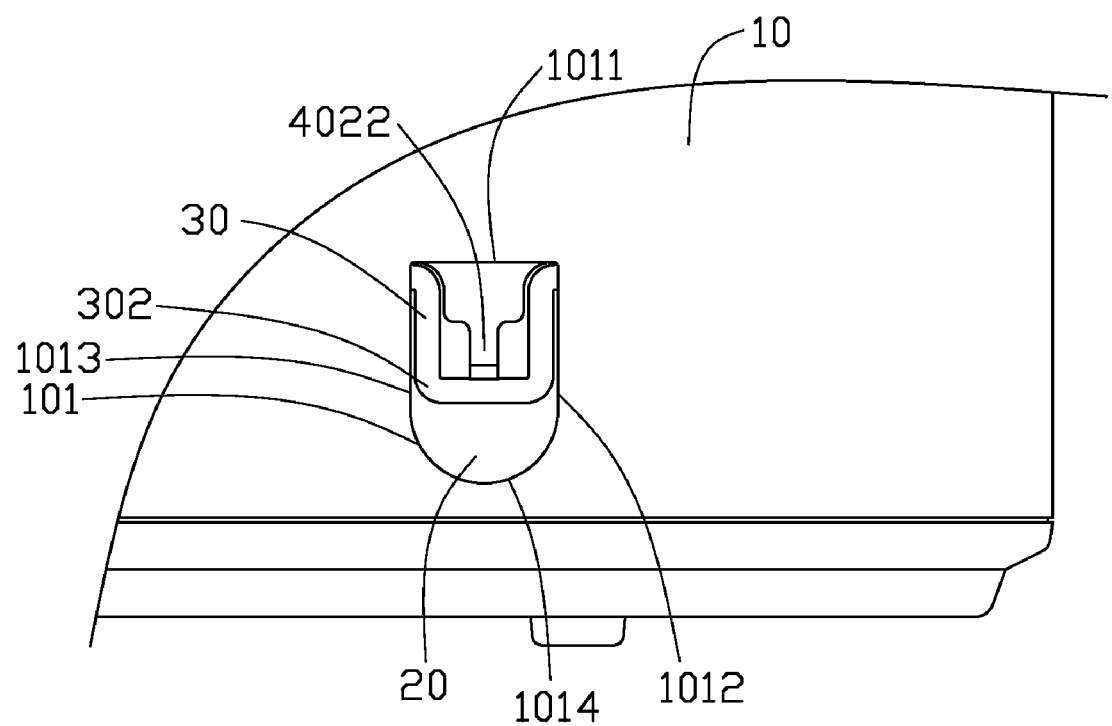
FIG. 4 is a planar view of FIG. 3.

Also referring to FIG. 4, in this embodiment, the opening 101 is approximately retangular in shape. In detial, the opening 101 is defined by four edges: a linear top edge 1011, two opposing linear side edges 1012, 1013, and an arc bottom edge 1014. The engagement-receiving member 20 includes a main plate 202 and two side plates 201. The main plate 202 is shaped and sized substantially the same as the opening 101. The two side plates 201 are aligned with the two side edges 1012, 1013 of the opening 101 and the two corresponding edges of the main plate 202 respectively, and connects to the main plate 202 and the housing 10. The side plates 201 can be integrally formed with the main plate 202 and/or the housing 10. Optionally, the engagement-receiving member 20 may further includes an arc side plate 203. The arc side plate 203 is shaped so as to connect the bottom edge of the main plate 202 and the arc bottom edge 1014. Also, the arc side plate 203 can be integrally formed with the main plate 202 and the housing 101. Thereby, the opening 101 is partially sealed by the engagement-receiving member 20, but leaving the rod entrance 50 defined by the top edge 204 of the main plate 202 and the opening 101.

The rod-bearing portions 2011 are respectively defined in the two side plates 201.

Figure 2:
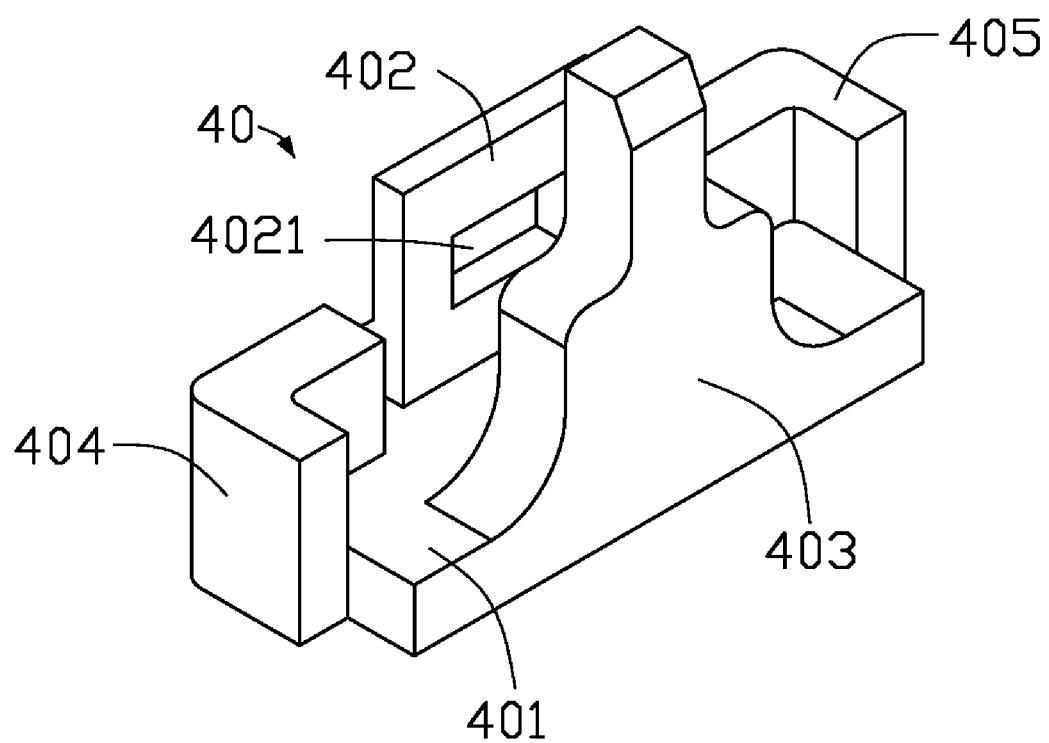
FIG. 2 is an isometric view of the securing member of FIG. 1.
Figure 3:
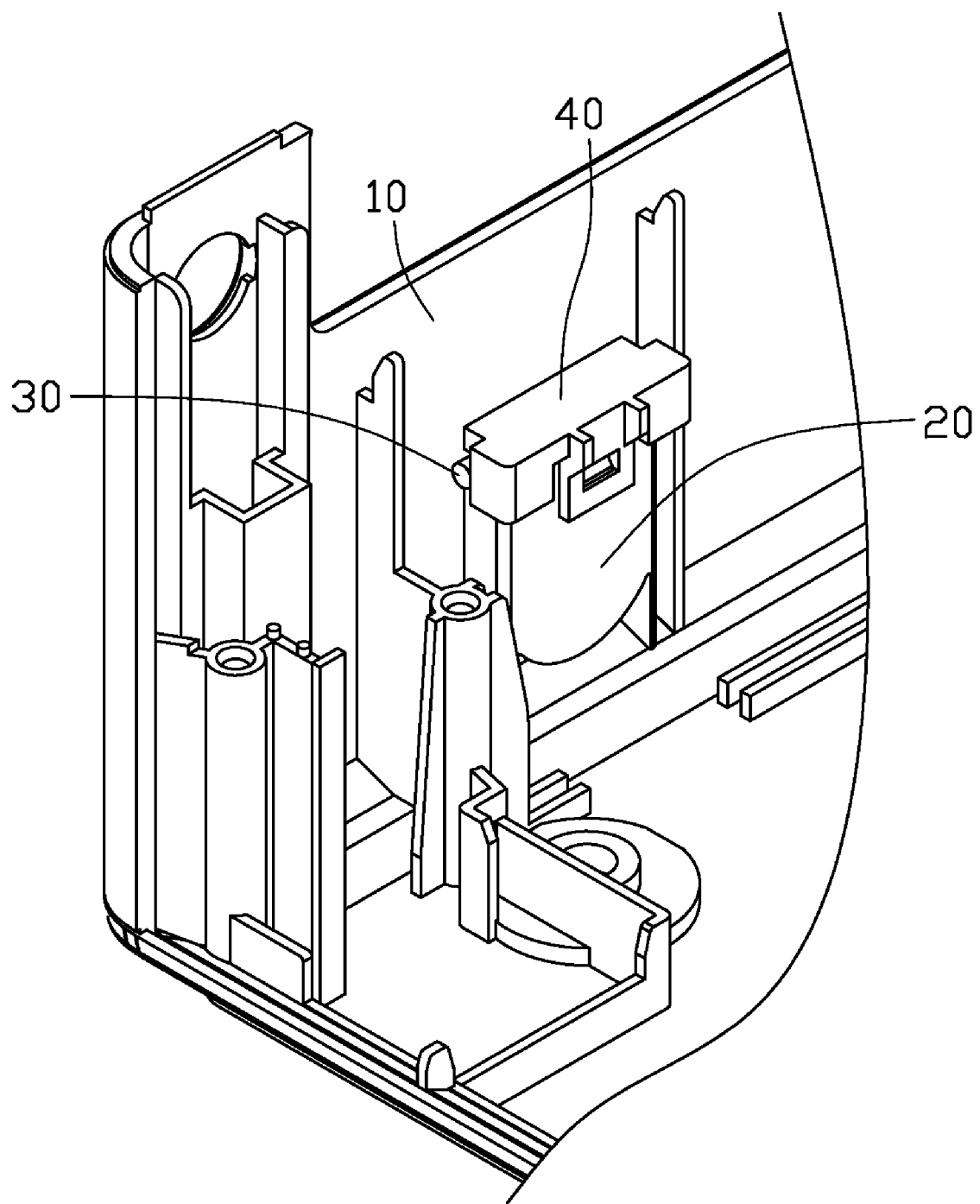
FIG. 3 is an isometric, assembled view of the locking structure in FIG. 1.

Referring to FIGS. 2 and 3, the securing member 40 is cap-shaped and thereby can be tightly fit into the main plate 202 ate the rod entrance 50. In detail, the securing member includes a top plate 401 and an a rear side plate 402, a front side plate 403 and other side plates 404, 405. The rear side plate 402 defines a jaw 4021, the outside surface of the main plate 202 of the engagement-receiving member 20 forms an engaging portion 205. When the securing member 40 is capped to the main plate 202, the engage portion 205 engages with the jaw 4021. Thereby, further tightly securing the securing member 40 to the main plate 202. The front side plate 403 is entered into the rod entrance 50 when the securing member 40 is capped to the main plate 202 and is shaped so as to releasably stop the swinging portion 302 when it was received within the opening 101.

Referring again to FIG. 4, when used, the swinging portion 302 can be swung out the housing 10 and can be locked by any locks. Therefore, strictly mating requirement to the lock to work with the conventional locking structures is eliminated.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An locking structure of a housing for a portable electronic device, the housing defining an opening therein, the locking structure comprising:

an engagement-receiving member, the engagement-receiving member being fixed to the housing so as to partially seal the opening but leave a rod entrance between the engagement-receiving member and the housing, the engagement-receiving member forming two rod-bearing portions at the entrance;

a bended rod forming two distal shaft portions and a mesial swinging portion, the two distal shaft portions being borne by the rod rod-bearing portions respectively, the swinging portion being received in the opening and capable of swinging out from the opening; and a securing member, the securing member being shaped in such a way so as to tightly fit into the rod entrance, thereby securing the bended rod to the engagement-receiving member.

2. The locking structure as claimed in claim 1, wherein the opening is defined by four edges: a linear top edge, two opposing linear side edges, and an arc bottom edge.

3. The locking structure as claimed in claim 2, wherein the engagement-receiving member further forms a main plate and two side plates integrally formed with the main plate, the main plate is shaped and sized substantially the same as the opening, the two side plates are aligned with the two side edges of the opening and the two corresponding edges of the main plate respectively and connect the main plate and the housing, the outside surface of the main plate forms an engaging portion.

4. The locking structure as claimed in claim 3, wherein the engagement-receiving member further forms an arc side shaped in such a way so as to connect the bottom edge of the main plate and the opening.

5. The locking structure as claimed in claim 4, wherein the securing member includes a top plate, an a rear side plate, a front side plate and two other side plates, the rear side plate defines a jaw; the securing member is capable of being capped to the main plate, and the engaging portion of the engagement-receiving member is capable of engaging with the jaw; and the front side plate is capable of entering into the rod entrance.

* * * * *